United States Patent
Liang et al.

(10) Patent No.: US 10,362,623 B2
(45) Date of Patent: Jul. 23, 2019

(54) APPARATUS AND METHOD FOR PAGING OVERLAP MITIGATION

(71) Applicant: Samsung Electronics Co., Ltd., Gyeonggi-do (KR)

(72) Inventors: Yangwen Liang, San Diego, CA (US); Fangming He, San Diego, CA (US); Srinivas Gururaja, Poway, CA (US); Tariq Al-Khasib, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 152 days.

(21) Appl. No.: 15/260,972

(22) Filed: Sep. 9, 2016

(65) Prior Publication Data

US 2018/0020464 A1   Jan. 18, 2018

Related U.S. Application Data

(60) Provisional application No. 62/362,797, filed on Jul. 15, 2016.

(51) Int. Cl.
 *H04W 76/28* (2018.01)
 *H04W 68/00* (2009.01)

(52) U.S. Cl.
 CPC ............ *H04W 76/28* (2018.02); *H04W 68/00* (2013.01)

(58) Field of Classification Search
 CPC ............ H04W 72/1231; H04W 76/28; H04W 84/042
 See application file for complete search history.

(56) References Cited

U.S. PATENT DOCUMENTS

| | | | |
|---|---|---|---|
| 7,974,643 B2 | 7/2011 | Catovic et al. | |
| 8,126,482 B2 | 2/2012 | Teague et al. | |
| 8,265,661 B2 | 9/2012 | Chin et al. | |
| 8,634,383 B2 | 1/2014 | Chin et al. | |
| 8,880,106 B2 | 11/2014 | Dhanda et al. | |
| 8,996,041 B2 | 3/2015 | Chin et al. | |
| 9,100,888 B2 | 8/2015 | Roullier et al. | |
| 9,282,536 B2 | 3/2016 | Ponukumati | |
| 9,326,268 B2 | 4/2016 | Xia et al. | |
| 2007/0011639 A1* | 1/2007 | Pitts | G06F 17/5072 716/52 |
| 2012/0275380 A1 | 11/2012 | Chin et al. | |
| 2013/0090137 A1* | 4/2013 | Krishnamoorthy | H04W 68/02 455/458 |
| 2013/0225123 A1 | 8/2013 | Adjakple et al. | |
| 2014/0036710 A1 | 2/2014 | Chin et al. | |
| 2014/0128082 A1 | 5/2014 | Chirayil | |
| 2014/0171147 A1 | 6/2014 | Rysgaard | |

(Continued)

*Primary Examiner* — Jackie Zuniga Abad
(74) *Attorney, Agent, or Firm* — The Farrell Law Firm, P.C.

(57) ABSTRACT

An apparatus and a method. The apparatus includes a first subscriber identity module (SIM); a second SIM; a dual SIM resource controller (DSRC) connected to the first SIM and the second SIM; and a radio frequency (RF) communication entity connected to the DSRC, wherein the DSRC performs one of scheduling a first paging preparation period of the first SIM prior to a second paging preparation period of the second SIM and re-attempting by the first SIM an RF request for the RF communication entity after an initial RF request for the RF communication entity is not granted.

20 Claims, 6 Drawing Sheets

(56) References Cited

U.S. PATENT DOCUMENTS

| | | |
|---|---|---|
| 2015/0079986 A1* | 3/2015 | Nayak ............... H04W 52/0229 455/435.2 |
| 2015/0109961 A1 | 4/2015 | Patil et al. |
| 2015/0163827 A1 | 6/2015 | Ekici |
| 2015/0215894 A1 | 7/2015 | Hayashi |

* cited by examiner

US 10,362,623 B2

APPARATUS AND METHOD FOR PAGING OVERLAP MITIGATION

PRIORITY

This application claims priority under 35 U.S.C. § 119(e) to a U.S. Provisional Patent Application filed on Jul. 15, 2016 in the United States Patent and Trademark Office and assigned Ser. No. 62/362,797, the entire contents of which are incorporated herein by reference.

FIELD

The present disclosure relates generally to an apparatus and a method for paging overlap mitigation, and more particularly, to an apparatus and method for paging overlap mitigation.

BACKGROUND

A dual subscriber identity module (SIM) dual standby (DSDS) device (e.g., a mobile phone) typically supports two SIMs in a standby mode. This indicates that both SIMs are active and on standby if both SIMs are not being used. However, when one SIM is being used (e.g., the SIM is being used during a call), the other SIM is inactive. For example, a DSDS device may include two SIMs that are each connected to a respective first radio access technology (RAT) (e.g., a second generation (2G) RAT) and a second RAT (e.g., a third generation (3G) RAT).

Due to the independent discontinuous reception (DRX) cycle configurations that a network may set for same or different type RATs on different SIMs in a DSDS device, there is a possibility of a partial overlap of paging durations between the RATs.

A paging process may be used to transmit paging information to a user equipment (UE). There are numerous reasons for using a paging process, for example, to trigger a cell update process, to establish a signaling connection, and to trigger an update of system information. A conventional paging process responds to a paging overlap (partial or complete) by randomly selecting one of the SIMs for paging signal reception and dropping the other SIM. For example, a round-robin method performs a paging process for a first RAT and does not perform a paging process for a second RAT. Then, for the next paging overlap, performing a paging process for the second RAT and not performing a paging process for a first RAT). Responding to a paging overlap in a round-robin manner results in a paging opportunity always not being received (e.g. being missed or lost) by one of the RATs.

SUMMARY

According to one embodiment, a system and a method each begin preparation for paging reception for a first radio access technology (RAT) earlier in anticipation of a partial paging overlap with a second RAT. The system and method each anticipates a partial paging overlap condition between different RATs and re-schedules one of the paging occasions to begin early preparation based on the anticipated partial paging overlap condition.

According to one embodiment, if paging overlap information is not available to the system and method ahead of time, the system and method each selectively re-attempts a radio frequency (RF) request for paging detection if the RF request is not granted at the first attempt. This allows the system and the method each to process pages in partial paging overlap situations as opposed to processing only one of the pages thereby mitigating page losses. This improves page performance in a DSDS device.

According to one embodiment, an apparatus includes a first SIM; a second SIM; a dual SIM resource controller (DSRC) connected to the first SIM and the second SIM; and an RF communication entity connected to the DSRC, wherein the DSRC performs one of scheduling a first paging preparation period of the first SIM prior to a second paging preparation period of the second SIM and re-attempting by the first SIM an RF request for the RF communication entity after an initial RF request for the RF communication entity is not granted.

According to one embodiment, a method includes performing one of scheduling, by a dual SIM resource controller (DSRC), a first paging preparation period of a first SIM prior to a second paging preparation period of a second SIM and re-attempting by the first SIM a radio frequency (RF) request for an RF communication entity after an initial RF request for the RF communication entity is not granted.

According to one embodiment, a method of manufacturing a DSRC includes forming the DSRC as part of a wafer or package that includes at least one other DSRC, wherein the DSRC is configured to mitigate partial paging overlap between a first radio access technology (RAT) associated with a first SIM and a second RAT associated with a second SIM by either scheduling a time for paging preparation earlier than immediately prior to a paging decode period of the first RAT or reattempting by the first SIM an RF request for an RF communication entity after an initial RF request for the RF communication entity is not granted; and testing the DSRC, wherein testing the DSRC comprises testing the DSRC and the at least one other DSRC using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include a DSRC configured to mitigate partial paging overlap between a first RAT associated with a first SIM and a second RAT associated with a second SIM by either scheduling a time for paging preparation earlier than immediately prior to a paging decode period of the first RAT or reattempting by the first SIM an RF request for an RF communication entity after an initial RF request for the RF communication entity is not granted; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
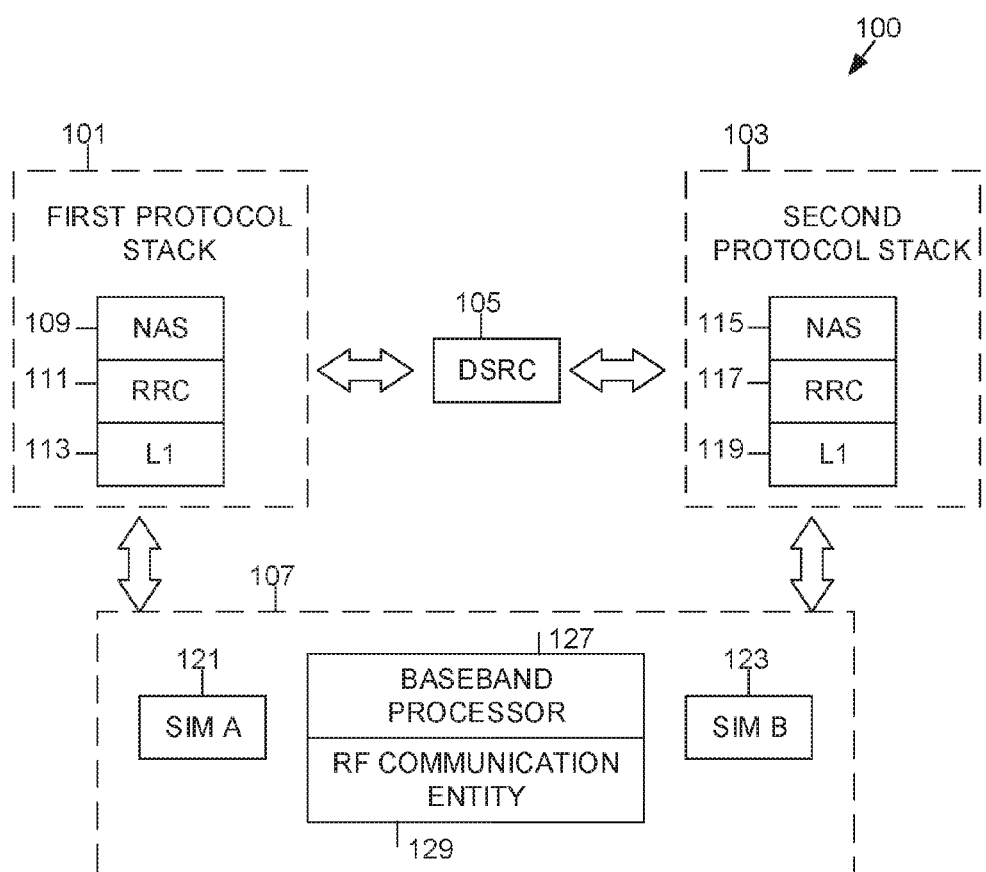
FIG. 1 is a block diagram of a DSDS system, according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclose discloses a system and a method that each begins preparation for paging reception for a first RAT earlier in anticipation of a partial paging overlap with a second RAT. According to one embodiment of the present disclosure, a system and a method each anticipates a partial paging overlap condition between different RATs and re-schedules one of the paging occasions to begin early preparation than in a situation in which there is no paging overlap in anticipation of a partial paging overlap condition.

According to one embodiment, if paging overlap information is not available to a system or a method of the present disclosure before a partial paging overlap occurs, a system and method of the present disclosure selectively re-attempts an RF request for paging detection if an RF request is not granted at a first attempt. This enables a system and method of the present disclosure to each process pages in a partial paging overlap situation as opposed to processing only one of the pages as in a conventional method, thereby mitigating page loss. This improves page performance in a DSDS device.

FIG. 1 is a block diagram of a DSDS system 100, according to an embodiment of the present disclosure. FIG. 1 illustrates an exemplary block diagram of a DSDS protocol stack, according to one embodiment. The DSDS system 100 is configured to mitigate partial paging overlap.

Referring to FIG. 1, the DSDS system 100 includes a first protocol stack 101, a second protocol stack 103, a dual SIM resource controller (DSRC) 105, and a device (e.g. a mobile phone) 107.

The first protocol stack 101 provides a protocol stack for a first SIM. The first protocol stack 101 may include a non-access stratum (NAS) 109, a radio resource controller (RRC) 111, and a physical layer 113 in layer 1 of the open systems interconnection (OSI) layers.

The second protocol stack 103 provides a protocol stack for a second SIM in a DSDS system. The second protocol stack 103 may include a NAS 115, an RRC 117, and a physical layer 119 in layer 1 of the OSI layers.

The DSRC 105 controls hardware resources shared between the RRC 111 of the first protocol stack 101 and the RRC 117 of the second protocol stack 103. The DSRC 105 resolves resource conflicts during the access of shared hardware resources between the RRC 111 of the first protocol stack 101 and the RRC 117 of the second protocol stack 103. The DSRC 105 may be implemented in hardware or software.

The device 107 may include a first SIM 121 (e.g. SIM A), a second SIM 123 (e.g. SIM B), a baseband processor 127, and an RF communication entity 129. SIM A 121 and SIM B 123 may each be associated with the same type of RAT or may each be associated with a different type of RAT, and may be contained in separate packages or in the same package. The baseband processor 127 may include a digital signal processor.

Figure 2:
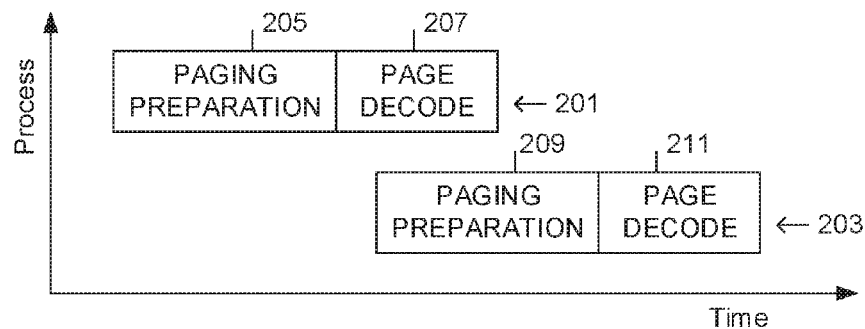
FIG. 2 is a diagram of a partial paging overlap situation across a first RAT and a second RAT, according to an embodiment of the present disclosure.

FIG. 2 is a diagram of a partial paging overlap in time between a first RAT 201 associated with a first SIM of a DSDS device and a second RAT 203 associated with a second SIM of the DSDS device, according to an embodiment of the present disclosure. The first RAT 201 and the second RAT 203 may be of the same type (e.g., each a 2G RAT, each a 3G RAT) or different types (e.g., one being a 2G RAT and the other being a 3G RAT). However, the present disclosure is not limited to using a 2G RAT or a 3G RAT for the first RAT and the second RAT. An embodiment of the present disclose may use a fourth generation RAT (e.g., a long term evolution (LTE) RAT) or any compatible further generation RAT.

Referring to FIG. 2, the first RAT 201 includes a paging preparation period 205 and a page decode period 207, where the page decode period 207 of the first RAT 201 overlaps a paging preparation period 209 of the second RAT 203, where the second RAT 203 includes a page decode period 211. Such an overlap is referred to as a partial overlap, because the entire page decode period 207 of the first RAT 201 does not overlap the paging decoding period 211 of the second RAT 203.

The paging preparation period 205 of the first RAT 201 or the paging preparation period 209 of the second RAT 203 are each a paging wake-up period for the first RAT 201 and the second RAT 203, respectively. The paging wake-up period may include an RF configuration period and a measurement period. The paging wake-up period of the first RAT 201 and the second RAT 203 are each followed by a page decoding period 207, 211, respectively.

A partial paging overlap, as shown in FIG. 2, results in a page for either the first RAT 201 or the second RAT 203 being missed if the conventional method of responding to a paging overlap is employed.

Figure 3:
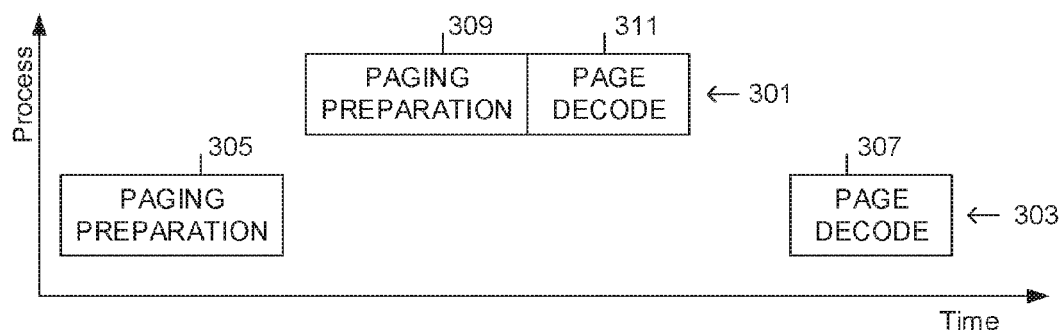
FIG. 3 is a diagram of partial paging overlap mitigation, according to an embodiment of the present disclosure.

FIG. 3 is a diagram of mitigating a partial paging overlap, according to an embodiment of the present disclosure.

Referring to FIG. 3, a paging preparation period 305 of a second RAT 303 associated with a second SIM of a DSDS device is moved from immediately preceding a page decode period 307 of the second RAT 303 to before a paging preparation period 309 of a first RAT 301 associated with a first SIM of the DSDS device with which a partial paging overlap initially existed (as illustrated in FIG. 2), where a page decode period 311 of the first RAT 301 immediately follows the paging preparation period 309 of the first RAT 301. By moving the paging preparation period 305 of one of the RATs (e.g. the second RAT 303) between which a partial paging overlap initially exists so that the paging no longer overlaps, the pages for both RATs 301, 303 may be processed so that neither page is missed by the intended RAT. Thus, page loss is mitigated.

Figure 4:
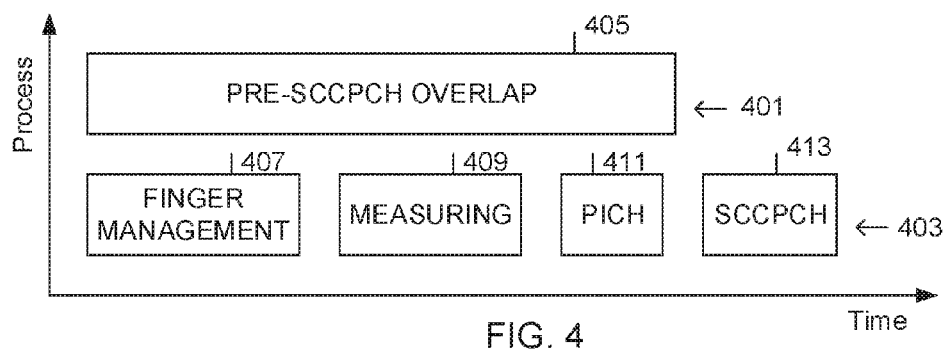
FIG. 4 is a diagram of partial paging overlap between a 2G RAT and a 3G RAT, according to an embodiment of the present disclosure.

FIG. 4 is a diagram of a partial paging overlap between a 2G RAT 401 and a 3G RAT 403, according to an embodiment of the present disclosure. However, the present disclosure is not limited thereto. All possible combinations of RAT types may be employed in the present disclosure. An embodiment of the present disclosure may use a fourth generation RAT (e.g., a long term evolution (LTE) RAT) or any compatible further generation RAT.

Referring to FIG. 4, the 2G RAT 401 associated with a first SIM in a DSDS device includes 2G paging 405, and the 3G RAT 403 associated with a second SIM in the DSDS device includes a finger measurement period 407 (e.g., a period for managing at least one sub-receiver, where a sub-receiver is referred to as a "finger"), a measuring period 409, a paging indicator channel (PICH) 411, and an SCCPCH 413. A paging channel (PCH) refers to a downlink transport channel used to carry paging information to a UE in a 3G RAT. The 2G 405 on the first SIM includes a paging preparation period and a paging decode period, which may overlap the pre-SCCPCH period of the 3G RAT 403 on the second SIM. The 2G paging 405 overlaps the 3G RAT 403 if the 2G paging 405 overlaps either the finger management period 407, the measuring period 409, the PICH 411, or any combination thereof, of the 3G RAT 403.

There is an overlap between the paging process of the 2G RAT 401 and the 3G paging process of the 3G RAT 403, but no overlap of the 2G RAT 401 and the SCCPCH 413 of the 3G RAT 403. Thus, there is a partial overlap of the paging processes of the 2G RAT 401 and the 3G RAT 403. If a conventional method of responding to the partial paging overlap is used, one of the pages intended for either the 2G RAT 401 or the 3G RAT 403 would be missed. In one embodiment of the present disclosure, neither page intended for the 2G RAT 401 and the 3G RAT 403 is missed.

Figure 5:
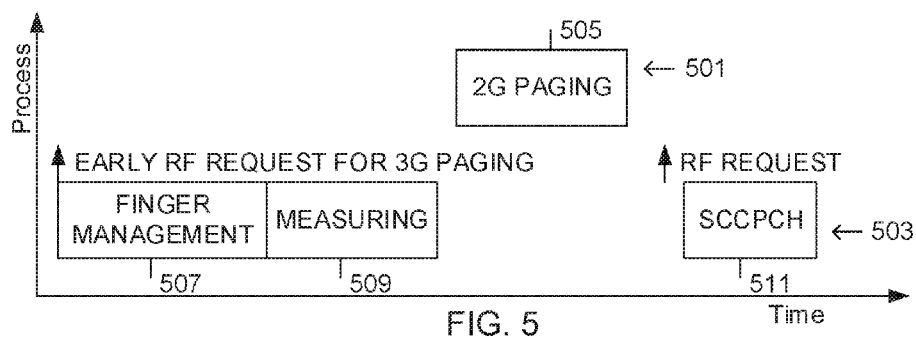
FIG. 5 is a diagram of partial paging overlap mitigation based on an earlier preparation time, according to an embodiment of the present disclosure.

FIG. 5 is a diagram of partial paging overlap mitigation based on an earlier preparation time, according to an embodiment of the present disclosure.

Referring to FIG. 5, a partial overlap of paging between a 2G RAT 501 associated with a first SIM of a DSDS device and a 3G RAT 503 associated with a second SIM of the DSDS device is mitigated by anticipating the partial paging overlap and initiating, or waking up, the paging process of the 3G RAT 503 earlier than immediately before page decoding, where the 2G RAT 501 includes 2G paging 505 which further includes a paging preparation period and a page decode period, and where the 3G RAT 503 includes a paging preparation period that includes a finger management period 507, a measuring period 509, and an SCCPCH 511. For example, the 3G RAT 503 may receive, prior to entering a reduced or low power state (e.g., a sleep state), scheduling information indicating the timing of a partial paging overlap that may occur when the 3G RAT 503 is normally scheduled (e.g. immediately prior to a scheduled paging decode period) to transition from a sleep state to a sufficiently powered state (i.e., a wake-up state). Thus, the 3G paging preparation period is initiated earlier than the paging preparation period 505 of the 2G RAT 501 to avoid the partial paging overlap between the 2G RAT 501 and the 3G RAT 503.

In one embodiment of the present disclosure, the timing to initiate an early paging preparation period is determined based on the timing of the expected partial paging overlap between the 2G RAT 501 and the 3G RAT 503. Based on the time to initiate an early paging preparation period, a baseband processor (e.g. baseband processor 127 of FIG. 1) associated with the 3G RAT 503 is awakened at the determined time to initiate an early paging preparation period instead of immediately preceding the paging decode period.

In one embodiment of the present disclosure, a logic device is included to pause a RAT paging process (e.g., a 3G RAT, a 2G RAT) and resume usage of an associated communication device (e.g. the RF communication entity 129 of FIG. 1) if a conflict arises between paging decoding of two different RATs, where the two RATs may be of the same type (e.g., both 2G RATs, both 3G RATs, etc.) or different types (e.g., a 2G RAT and a 3G RAT, etc.).

Figure 6:
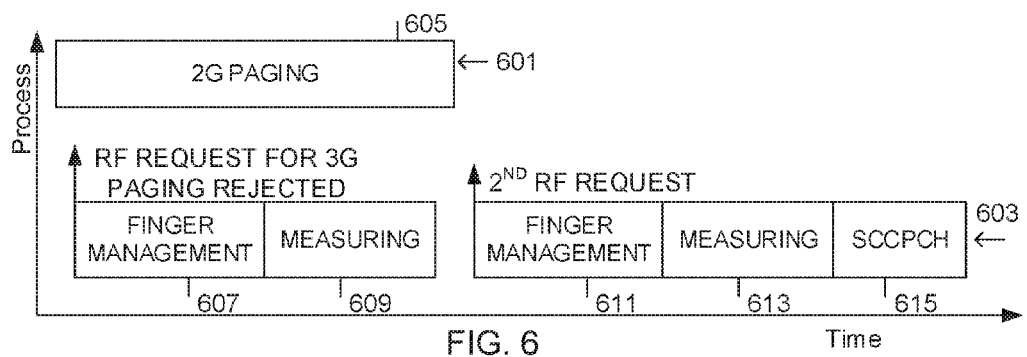
FIG. 6 is a diagram of partial paging overlap mitigation based on reattempting an RF request, according to an embodiment of the present disclosure.

FIG. 6 is a diagram of partial paging overlap mitigation based on reattempting an RF request, according to an embodiment of the present disclosure.

Referring to FIG. 6, a 2G RAT 601 associated with a first SIM of a DSDS device partially overlaps a 3G RAT 603 associated with the second SIM of the DSDS device, where the 2G RAT 601 includes 2G paging 605 that further includes a paging preparation period and a page decode period, and where the 3G RAT 603 includes a paging preparation period that includes a finger management period 607 for a first RF request for 3G paging, a measuring period 609, a second finger management period 611 and a second measuring period 613 for each subsequent RF request for 3G paging, and an SCCPCH 615. However, the present disclosure is not limited thereto. Any combination of RAT types may be used in the present disclosure. An embodiment of the present disclosure may use a fourth generation RAT (e.g., a long term evolution (LTE) RAT) or any compatible further generation RAT.

If information is not received before a RAT enters a sleep state, which indicates a potential partial paging overlap when the RAT awakens, then the RAT cannot determine a time to awaken that is earlier than immediately prior to a page decode period. For example, the 3G RAT 603 may not receive, prior to entering a sleep state, scheduling information to indicate that a partial paging overlap event with the 2G RAT 601 will occur if the 3G RAT 603 awakens immediately prior to a paging decode period of the 3G RAT 603, which may be due to the presence of another scheduled event prior to the paging event of interest. Thus, as indicated in FIG. 6, the 3G RAT 603 makes a first RF request for 3G paging when there is a partial paging overlap with the 2G RAT 601. Using a conventional method to respond to a partial paging overlap, the RF request of the 3G RAT 603 may be denied if the method chooses to allow paging of the 2G RAT 601 instead of the 3G RAT 603. If the RF request for 3G paging by the 3G RAT 603 is denied, the 3G RAT 603 will miss a page unless the partial paging overlap is mitigated.

If the 3G RAT 603 awakens, makes an RF request for 3G paging, and the request is denied because of a partial paging overlap with the 2G RAT 601, then the 3G RAT 603 makes a another RF request (e.g., a second RF request if the first RF request is rejected, a third RF request if the first and second RF requests are rejected, and so on) for 3G paging at a time that may not overlap with the paging of the 2G RAT 601. If an RF request for 3G paging is made at a time that overlaps with the paging of the 2G RAT 601 and, therefore, the RF request is rejected, then another RF request for 3G paging is made at a time that may not overlap with the paging of the 2G RAT 601. According to one embodiment, one or more RF requests for 3G paging are made at a time that may not overlap with the paging of the 2G RAT 601.

Figure 7:
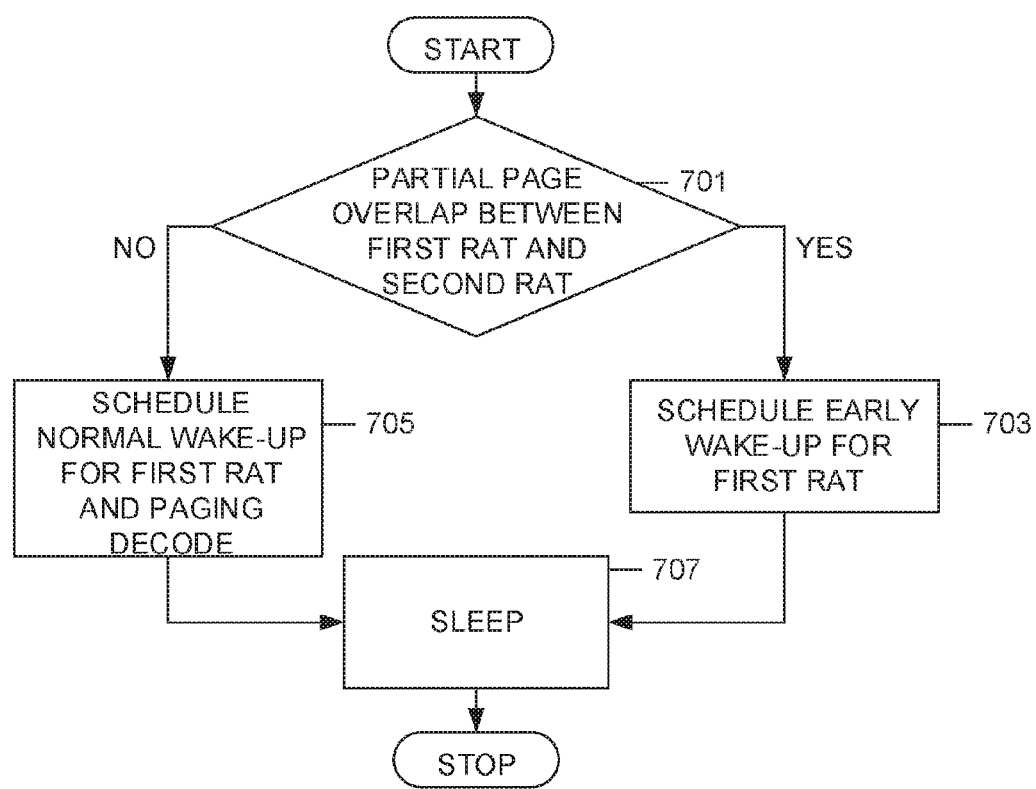
FIG. 7 is a flowchart of a method of a system of partial paging overlap mitigation, according to an embodiment of the present disclosure.

FIG. 7 is a flowchart of a method of a system of partial paging overlap mitigation, according to an embodiment of the present disclosure.

Referring to FIG. 7, a first RAT associated with a first SIM of a DSDS device (e.g. a UE) is awakened earlier than immediately prior to a paging decode period associated with the first RAT to mitigate a partial paging overlap with another RAT.

At 701, the present system determines whether or not there is a partial paging overlap between paging of the first RAT and a second RAT associated with a second SIM of the DSDS device.

If the present system determines at step 701 that a partial paging overlap exists between paging of the first RAT and paging of the second RAT then, at 703, a sleep scheduler for the first RAT schedules a wake up of the first RAT for the next paging that is earlier than immediately prior to a page decode period associated with the next paging, so that there will not be a partial paging overlap between the first RAT and the second RAT during the next paging.

After the sleep scheduler schedules a wake up of the first RAT for the next paging, the first RAT returns to the sleep state at 707 to await the next paging.

If the present system determines at step 701 that a partial paging overlap does not exist between paging of the first RAT and paging of the second RAT then, at 705, the sleep scheduler for the first RAT wakes up the first RAT immediately prior to the page decode period for the current paging (e.g. a normal wake up) and decodes the paging during the page decoding period for the current paging.

After the paging is decoded at step 705, the first RAT schedules a wake-up time for the next paging cycle and returns to the sleep state at 707.

Figure 8:
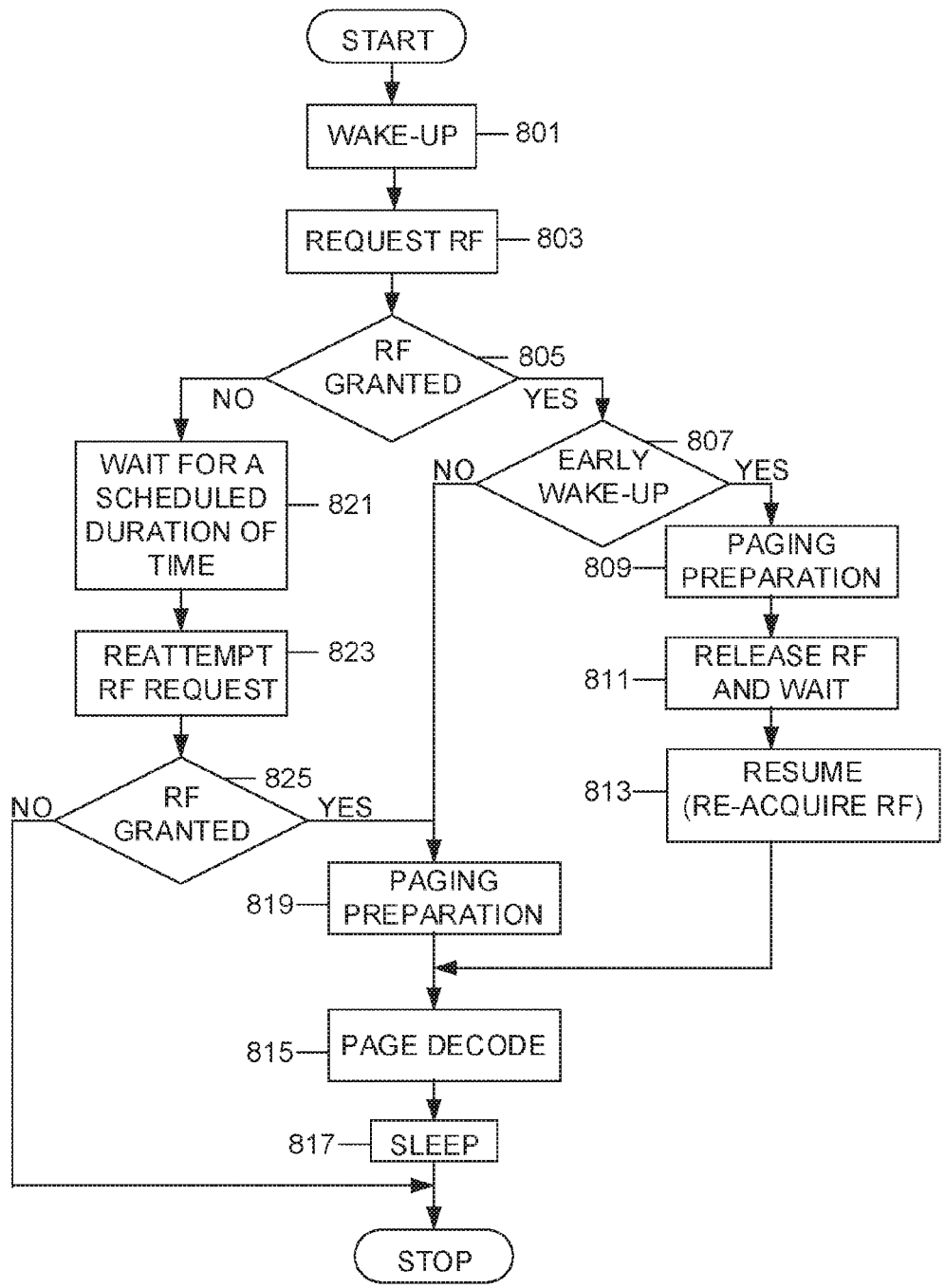
FIG. 8 is a flowchart of a method of a system of partial paging overlap mitigation, according to an embodiment of the present disclosure.

FIG. 8 is a flowchart of a method of a system of partial paging overlap mitigation, according to an embodiment of the present disclosure.

Referring to FIG. 8, a first RAT associated with a first SIM of a DSDS device is awakened (e.g. a UE) at 801.

At 803, the first RAT requests an RF communication entity for paging.

At 805, the method determines whether or not the request by the first RAT for an RF communication entity for paging is granted.

If an RF communication entity for paging is granted at 805, the method determines whether or not the current paging reception is an early wake-up situation (e.g., a partial paging overlap situation with another RAT) or not (e.g. a paging reception with no paging overlap with another RAT) at 807.

If the method determines at 807 that an early wake-up situation applies to the current paging reception, then paging preparation is completed earlier than immediately prior to the paging decode period at 809.

After paging preparation at 809 is completed, the first RAT releases the RF communication entity and waits until immediately prior to the paging decode period at 811.

After waiting until immediately prior to the paging decode period at 811, the first RAT resumes operation by re-acquiring an RF communication entity at 813.

After re-acquiring the RF communication entity at 813, the first RAT performs page decoding at 815.

After performing page decoding at 815, the first RAT returns to the sleep state at 817 and the method is terminated.

If an RF communication entity for paging is not granted at 805, the first RAT waits for a scheduled duration of time (e.g. a pre-determined amount of time) at 821.

After waiting the scheduled duration of time at 821, the first RAT reattempts requesting an RF communication entity for paging at 823.

At 825, the method determines whether or not the request by the first RAT for an RF communication entity for paging is granted.

If an RF communication entity for paging is granted at 825, paging preparation is completed immediately prior to the paging decode period at 819.

After paging preparation at 819 is completed, the first RAT the first RAT performs page decoding at 815.

After completing paging preparation at 819 and performing page decoding at 815, the first RAT returns to the sleep state at 817 and the method is terminated.

If an RF communication entity for paging is not granted at 825, the method is terminated.

Figure 9:
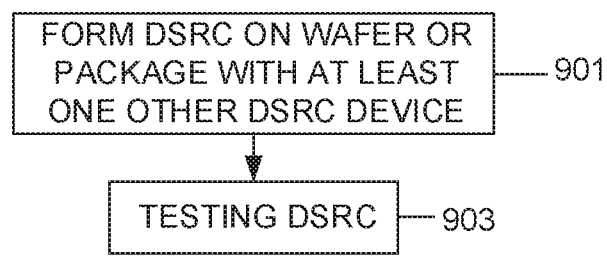
FIG. 9 is a flowchart of a method of manufacturing a DSRC, according to an embodiment of the present disclosure.

FIG. 9 is a flowchart of a method of manufacturing a DSRC, according to an embodiment of the present disclosure, where the DSRC is either implemented in hardware or implemented in hardware that is programed with software.

Referring to FIG. 9, the method, at 901, forms the DSRC as part of a wafer or package that includes at least one other DSRC. The DSRC is configured to mitigate partial paging overlap between a first RAT associated with a first SIM and a second RAT associated with a second SIM by either scheduling a time for paging preparation earlier than immediately prior to a paging decode period of the first RAT or reattempting by the first SIM an RF request for an RF communication entity after an initial RF request for the RF communication entity is not granted.

At 903, the method tests the DSRC. Testing the DSRC includes testing the DSRC and the at least one other DSRC using one or more electrical to optical converters, one or more optical splitters that split an optical signal into two or more optical signals, and one or more optical to electrical converters.

Figure 10:
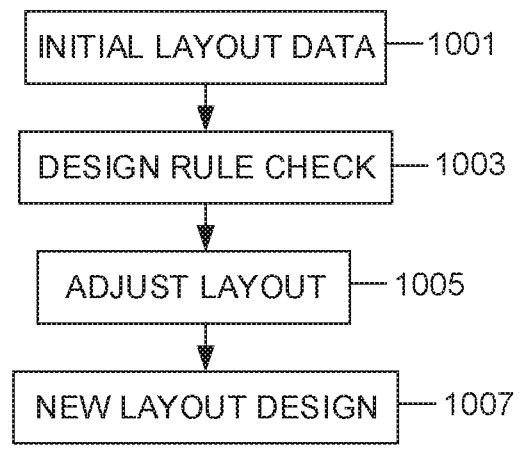
FIG. 10 is a flowchart of constructing an integrated circuit, according to an embodiment of the present disclosure.

FIG. 10 is a flowchart of constructing an integrated circuit, according to an embodiment of the present disclosure.

Referring to FIG. 10, the method, at 1001, generates a mask layout for a set of features for a layer of the integrated circuit. The mask layout includes standard cell library macros for one or more circuit features that include a DSRC. The DSRC is configured to mitigate partial paging overlap between a first RAT associated with a first SIM and a second RAT associated with a second SIM. Partial paging overlap is mitigated by either scheduling a time for paging preparation earlier than immediately prior to a paging decode period of the first RAT or reattempting by the first SIM an RF request for an RF communication entity after an initial RF request for the RF communication entity is not granted.

At 1003, the method disregards relative positions of the macros for compliance to layout design rules during the generation of the mask layout.

At 1005, the method checks the relative positions of the macros for compliance to layout design rules after generating the mask layout.

At 1007, the method, upon detection of noncompliance with the layout design rules by any of the macros, modifies the mask layout by modifying each of the noncompliant macros to comply with the layout design rules.

At 1009, the method generates a mask according to the modified mask layout with the set of features for the layer of the integrated circuit.

At 1011, the method manufactures the integrated circuit layer according to the mask.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
    a first subscriber identity module (SIM);
    a second SIM;
    a dual SIM resource controller (DSRC) connected to the first SIM and the second SIM; and
    a radio frequency (RF) communication entity connected to the DSRC,
    wherein the DSRC performs, when a partial paging overlap occurs between the first SIM and the second SIM, wherein the partial paging overlap includes a first portion from a first combination of a first paging preparation period and a first page decode period of the first SIM overlapping a second portion from a second combination of a second paging preparation period and a second page decode period of the second SIM,
        (a) scheduling the first paging preparation period of the first SIM prior to the second paging preparation period of the second SIM when an initial RF request for the RF communication entity is granted, and
        (b) re-attempting by the first SIM an RF: request for the RF communication entity when an initial RF request for the RF communication entity is not granted.

2. The apparatus of claim 1, wherein each of the first SIM and the second SIM includes a protocol stack, and wherein each of the first SIM and the second SIM is contained in a single package or in multiple packages.

3. The apparatus of claim 2, wherein the protocol stack of each of the first SIM and the second SIM is comprised of:
    a non-access stratum (NAS);
    a radio resource controller (RRC); and
    a first physical layer of layers of an open systems interconnection (OSI).

4. The apparatus of claim 1, wherein the first paging preparation period and the second paging preparation period are each associated with a type of radio access technology (RAT) that is equal to, or different from, each other.

5. The apparatus of claim 4, wherein the type of RAT is selected from the group of RAT types including a second generation (2G) RAT, a third generation (3G) RAT, a long term evolution (LTE) RAT, or any compatible further generation RAT.

6. A method, comprising:
    performing one of scheduling, by a dual subscriber identity module (SIM) resource controller (DSRC), when a partial paging overlap occurs between the first SIM and the second SIM, wherein the partial paging overlap includes a first portion from a first combination of a first paging preparation period and a first page decode period of the first SIM overlapping a second portion from a second combination of a second paging preparation period and a second page decode period of the second SIM,
        (a) scheduling the first paging preparation period of the first SIM prior to the second paging preparation period of the second SIM when an initial RF request for the RF communication entity is granted, and
        (b) re-attempting by the first SIM an RF request for the RF communication entity when an initial RF request for the RF communication entity is not granted.

7. The method of claim 6, wherein scheduling, by the DSRC, the first paging preparation period of the first SIM prior to a second paging preparation period of the second SIM comprises:
    transitioning, by a sleep scheduler, a first radio access technology (RAT) associated with the first SIM in a dual SIM dual standby (DSDS) device from a low power, or sleep state to a sufficiently powered, or awake state;

determining, by the DSRC, whether a partial paging overlap exists between the first RAT and a second RAT of a second SIM of the DSDS device;

if the partial paging overlap exists then scheduling, by the DSRC, the first RAT to awaken earlier than immediately prior to a paging decode period and eliminate the partial paging overlap, decoding paging of the first RAT, and transitioning to the sleep state; and if the partial paging overlap does not exist then scheduling, by the DSRC, the first RAT to awaken immediately prior to a paging decode period, decoding paging of the first RAT, and transitioning to the sleep state.

8. The method of claim 6, wherein each of the first SIM and the second SIM includes a protocol stack, and wherein each of the first SIM and the second SIM is contained in a single package or in multiple packages.

9. The method of claim 6, wherein the protocol stack of each of the first SIM and the second SIM is comprised of:
 a non-access stratum (NAS);
 a radio resource controller (RRC); and
 a first physical layer of layers of an open systems interconnection (OSI).

10. The method of claim 6, wherein the first RAT and the second RAT each have a type that is equal to, or different from, each other.

11. The method of claim 10, wherein the types of the first RAT and the second RAT are selected from the group of RAT types including a second generation (2G) RAT, a third generation (3G) RAT, a long term evolution (LTE) RAT, or any compatible further generation RAT.

12. The method of claim 6, wherein re-attempting by the first SIM the RF request for the RF communication entity after the initial RF request for the RF communication entity is not granted comprises:
 transitioning, by a sleep scheduler, a first radio access technology (RAT) associated with the first SIM in a dual SIM dual standby (DSDS) device from a low power, or sleep state to a sufficiently powered, or awake state;
 requesting a first time, by a radio resource controller (RRC), the radio frequency (RF) communication entity for the first RAT;
 if the first request for the RF communication entity is granted then determining, by the DSRC, to awaken the first RAT earlier than immediately prior to a paging decode period and eliminate a partial paging overlap;
 if the first RAT, by the DSRC, is awakened earlier than immediately prior to the paging decode period then performing paging preparation, releasing the RF communication entity, and waiting for immediately prior to the paging decode period;
 if the wait until immediately prior to the paging decode period is complete then re-acquiring, by the RRC, the RF communication entity, decoding paging, returning to the sleep state, and terminating the method;
 if the first RAT, by the DSRC, is awakened immediately prior to the paging decode period then performing paging preparation, decoding paging, entering the sleep mode, and terminating the method;
 if the first request for the RF communication entity is not granted then waiting a predetermined time, and requesting, a second time, by an RRC, an RF communication entity;
 if the second request for an RF communication entity is granted then performing paging preparation, decoding paging, returning to the sleep state, and terminating the method; and
 if the second request for an RF communication entity is not granted then terminating the method.

13. The method of claim 11, wherein each of the first SIM and the second SIM includes a protocol stack.

14. The method of claim 11, wherein the protocol stack of each of the first SIM and the second SIM is comprised of:
 a non-access stratum (NAS);
 a radio resource controller (RRC); and
 a first physical layer of layers of an open systems interconnection (OSI).

15. The method of claim 11, wherein the first RAT and the second RAT each have a type that is equal to, or different from, each other.

16. The method of claim 15, wherein the types of the first RAT and the second RAT are selected from the group of RAT types including a second generation (2G) RAT and a third generation (3G) RAT.

17. A method of manufacturing a dual subscriber identity module (SIM) resource controller (DSRC), comprising:
 forming the DSRC as part of a wafer or package that includes at least one other DSRC, wherein the DSRC is configured to, when a partial paging overlap occurs between a first SIM and a second SIM, wherein the partial paging overlap includes a first portion from a first combination of a first paging preparation period and a first page decode period of the first SIM overlapping a second portion from a second combination of a second paging preparation period and a second pace decode period of the second SIM,
 (a) schedule the first paging preparation period of the first SIM prior to the second pacing preparation period of the second SIM when an initial RF request fir the RF communication entity is granted, and
 (b) re-attempt by the first SIM an RF request for the RF communication entity when an initial RF request for the RF communication entity is not granted; and
 testing the DSRC, wherein testing the DSRC comprises testing the DSRC and the at least one other DSRC using one or more electrical to optical converters, one or more optical splitters that split an optical signal into two or more optical signals, and one or more optical to electrical converters.

18. The method of manufacturing the DSRC of claim 17, wherein the first RAT and the second RAT each have a type that is equal to, or different from, each other.

19. The method of manufacturing the DSRC of claim 17, wherein the types of the first RAT and the second RAT are selected from the group of RAT types including a second generation (2G) RAT and a third generation (3G) RAT.

20. A method of constructing an integrated circuit, comprising:
 generating a mask layout for a set of features for a layer of the integrated circuit, wherein the mask layout includes standard cell library macros for one or more circuit features that include a dual subscriber identity module (SIM) resource controller (DSRC) configured to, when a partial paging overlap occurs between a first SIM and a second SIM, wherein the partial paging overlap includes a first portion from a first combination of a first paging preparation period and a first page decode period of the first SIM overlapping a second portion from a second combination of a second paging preparation period and a second page decode period of the second SIM,
 (a) schedule the first paging preparation period of the first SIM prior to the second paging preparation period of the second SIM when an initial RF request for the RF communication entity is granted, and
(b) re-attempt by the first SIM an RF request for the RF communication entity when an initial RF request for the RIF communication entity is not granted;
disregarding relative positions of the macros for compliance to layout design rules during the generation of the mask layout;
checking the relative positions of the macros for compliance to layout design rules after generating the mask layout;
upon detection of noncompliance with the layout design rules by any of the macros, modifying the mask layout by modifying each of the noncompliant macros to comply with the layout design rules;
generating a mask according to the modified mask layout with the set of features for the layer of the integrated circuit; and
manufacturing the integrated circuit layer according to the mask.

* * * * *